(12) United States Patent
Rudnik

(10) Patent No.: US 11,425,018 B2
(45) Date of Patent: Aug. 23, 2022

(54) METHODS AND APPARATUS TO IMPLEMENT A VIRTUAL PRIVATE NETWORK WITH PROBE FOR NETWORK CONNECTIVITY

(71) Applicant: McAfee, LLC, Santa Clara, CA (US)

(72) Inventor: Lior Rudnik, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

(21) Appl. No.: 16/424,450

(22) Filed: May 28, 2019

(65) Prior Publication Data

US 2020/0382401 A1 Dec. 3, 2020

(51) Int. Cl.
*H04L 43/12* (2022.01)
*H04L 12/46* (2006.01)
*H04L 43/0811* (2022.01)

(52) U.S. Cl.
CPC .......... *H04L 43/12* (2013.01); *H04L 12/4633* (2013.01); *H04L 12/4641* (2013.01); *H04L 43/0811* (2013.01)

(58) Field of Classification Search
CPC .................................................. H04L 43/12
See application file for complete search history.

(56) References Cited

U.S. PATENT DOCUMENTS

| | | | |
|---|---|---|---|
| 2015/0128205 A1* | 5/2015 | Mahaffey | H04L 63/18 726/1 |
| 2018/0131719 A1 | 5/2018 | Amit et al. | |
| 2018/0213574 A1* | 7/2018 | Bareket | H04W 12/10 |

OTHER PUBLICATIONS

International Searching Authority, "International Search Report & Written Opinion" issued in connection with application No. PCT/US2020/034761 dated Aug. 17, 2020, 13 pages.
Patent Cooperation Treaty, "International Preliminary Report on Patentability" issued in connection with Application No. PCT/US20/34761, dated Nov. 16, 2021, 8 pages.

* cited by examiner

*Primary Examiner* — Jeffrey R Swearingen
(74) *Attorney, Agent, or Firm* — Hanley, Flight & Zimmerman, LLC

(57) ABSTRACT

Methods, apparatus, systems and articles of manufacture to implement a virtual private network with probe for network connectivity are disclosed. An example non-transitory computer readable storage medium is disclosed comprising instructions which, when executed, cause a machine to at least, in response to a first instruction from an operating system to establish a network tunnel, transmit a probe request to a server; and in response to not receiving, from the server, a probe response to the probe request, report that the network tunnel has been established to prevent the operating system from transmitting subsequent instructions to establish the network connection until a response to a probe request is received.

20 Claims, 5 Drawing Sheets

METHODS AND APPARATUS TO IMPLEMENT A VIRTUAL PRIVATE NETWORK WITH PROBE FOR NETWORK CONNECTIVITY

FIELD OF THE DISCLOSURE

This disclosure relates generally to network protocols, and, more particularly, to methods and apparatus to implement a virtual private network with probe for network connectivity.

BACKGROUND

As the use of the Internet has grown, an increasing number of attackers attempt to intercept network communications transmitted from a user's device to an intended destination via a network. To prevent such attackers from intercepting data, devices can implement a virtual private network (VPN) system to enable a VPN connection between two or more destinations to communicate securely and effectively, even, across a public network (e.g., the Internet).

BRIEF DESCRIPTION OF THE DRAWINGS

The figures are not to scale. In general, the same reference numbers will be used throughout the drawing(s) and accompanying written description to refer to the same or like parts.

Figure 1:
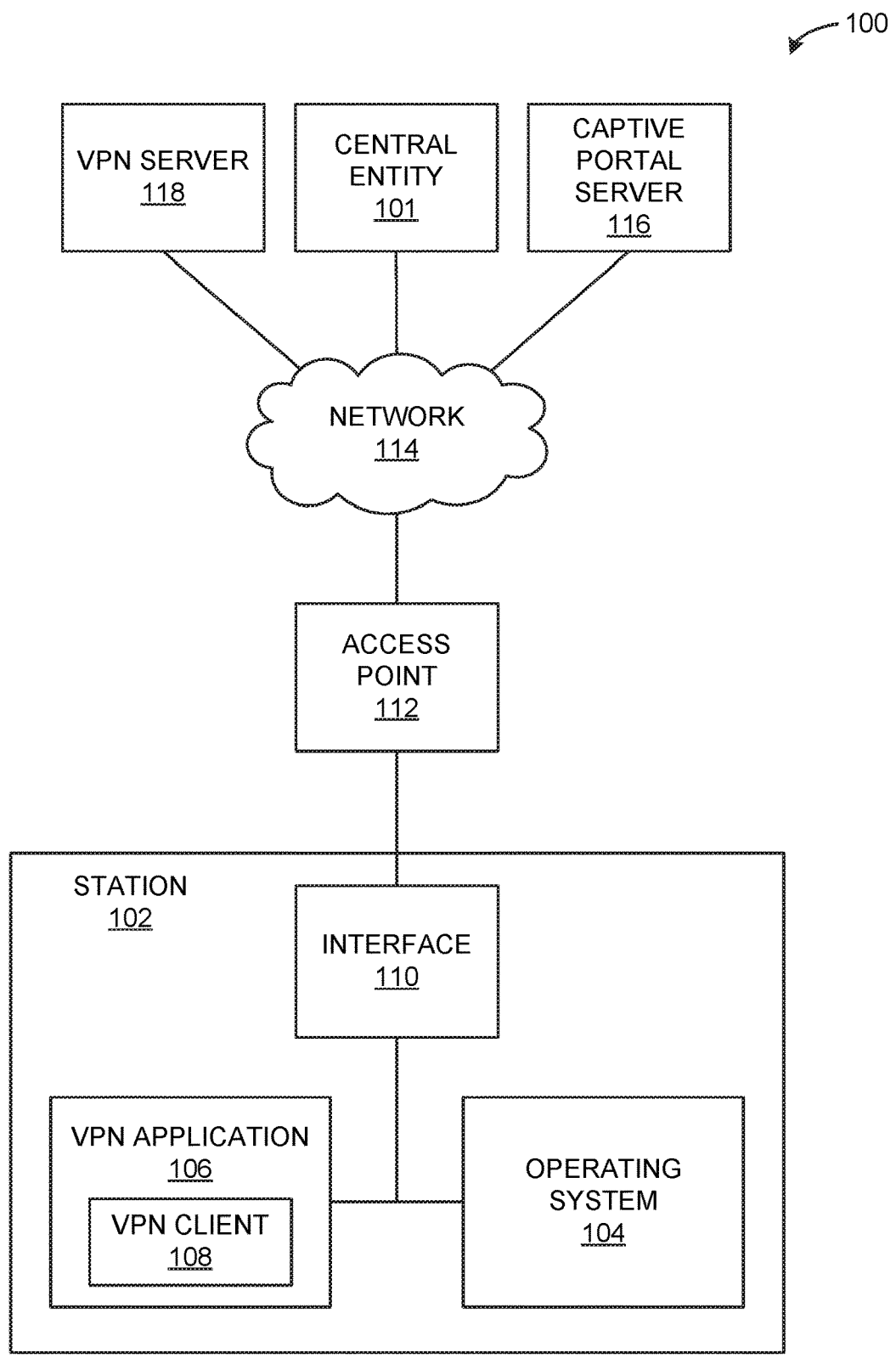
FIG. 1 is a block diagram an example environment for implementing a virtual private network in conjunction with examples disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Virtual private networks (VPNs) allow users of network-enabled devices (e.g., mobile phones, computers, laptops, tablets, and/or any other computing device capable of connecting to a network, such as the Internet) to access a private network and share data remotely through public networks, thereby allowing the user to benefit from, amongst other things, the security of a private network. In this manner, a user can access the Internet using an unsecured public network (e.g., via an access point, such as a Wi-Fi hotspot) while protecting the data on the computing device of the user. A VPN encrypts and redirects data to a target location (e.g., server) using an encrypted layered tunneling protocol so that an attacker cannot intercept the data.

Some computing device configure a VPN with automatic connection rules (e.g., on-demand rules). When automatic connection rules are implemented, the operating system (OS) of the computing device establishes a VPN tunnel (e.g., instructs a VPN application to establish a VPN tunnel) whenever the OS determines that there is a connection to a network. For example, as soon as the OS of a mobile device detects a connection to the Internet (e.g., detects a Wi-Fi connection to the Internet), the OS instructs the VPN application to establish a VPN tunnel so that the user can have protected access to the Internet. The VPN application temporarily suspends all network connectivity to establish the VPN tunnel while ensuring that no traffic is sent unprotected. If the VPN application establishes the protected connection (e.g., the VPN tunnel), network connectivity is restored and all traffic (or a subset of traffic) to/from the computing device is channeled through the VPN tunnel. If the VPN cannot establish a protected connection (e.g., a VPN tunnel), the VPN identifies the VPN tunnel failure to the OS.

Some access points (e.g., Wi-Fi access points, wired connection ports, etc.) are configured as captive portals. A captive portal provides limited Internet access to allow a user to connect to a limited number of servers and expands the access in response to the user verifying that they are an authenticated user. For example, a hotel may configure access points within the hotel to allow new and/or unknown devices limited access to the Internet to allow the devices to access a web site of the hotel, but not allow the device to access any other server and/or website on the Internet. If the user attempts to access another website, the browser is denied access and/or is redirected to the hotel's website until the device and/or user is authenticated. The hotel's web site may provide a field (e.g., a text box, a dropdown list, a check box, etc.), for example, for the user to identify themselves, accept a usage agreement, and/or otherwise authenticate themselves. Once the user identifies themselves, the access point unlocks access to additional parts of and/or all of the Internet and may include an identifier of the device on an authentication list for some duration of time (e.g., so that the device can have full and/or expanded access to the Internet for the duration of time).

When a computing device configured with a VPN having an automatic connection rule connects to a captive portal, the OS of the computing device determines that a connection to the Internet exists (e.g., the limited connection to a limited number of servers via the Internet). Accordingly, the OS instructs the VPN application to establish a VPN tunnel. The VPN, thus, restricts network access from the device while the VPN tunnel is established. However, because the captive portal only allows access to a limited number of servers (e.g., not including the VPN server), the VPN application will fail to establish the VPN tunnel and inform the OS of the failed attempt. However, because the OS is still detecting the connection to the Internet, the OS instructs the VPN application to retry to establish a VPN tunnel. Accordingly, when an access point limits the access to the Internet, the OS and VPN application of a computing device connected to the access point enters into an iterative loop for attempting to establish a VPN tunnel when it is not possible to establish the VPN tunnel. As described above, each time the VPN application attempts to establish the VPN tunnel, all Internet connectivity is suspended. Thus, a user cannot access the captive portal website to authenticate the device and open full and/or expanded access to the Internet. In such a scenario, the only option is for the user to erase the VPN configuration from the device (e.g., by uninstalling the VPN application).

Examples disclosed herein alleviate the infinite loop between the OS and the VPN application of a computing device. For example, when the VPN application receives instructions from the OS to establish a VPN tunnel, the VPN application transmits a probe request (e.g., an HTTP request) to a VPN server. If the VPN server responds with a preset response (e.g., known by both the VPN application and the VPN server), the VPN application determines that a full or expanded Internet connection is available and establishes the VPN tunnel. If the VPN application does not receive the preset response, the VPN application informs the OS that a VPN connection has been established (e.g., to prevent the infinite loop) and periodically or aperiodically sends out additional probe requests to the VPN server until the response is received. In this manner, a VPN application does not suspend Internet connectivity while there is a limited connection (e.g., so that the user can authenticate the device) and establishes a VPN tunnel after the full and/or expanded Internet connection is available (e.g., after the user authenticates the device).

FIG. 1 is a block diagram of an example environment 100 for implementing an automatically connected virtual private network for an example station 102 in conjunction with a captive portal. The example environment 100 of FIG. 1 includes an example central entity 101, the example station 102, an example access point 112, an example network 114, an example captive portal server 116 and an example virtual private network (VPN) server 118. The example station 102 includes an example operation system (OS) 104, an example VPN application 106, an example VPN client 108, an example interface 110.

The example central entity 101 of FIG. 1 is an entity that provides (e.g., pushes or transmits) executables to stations that, when executed by the stations, install, implement, and/or otherwise configure the example VPN application 106. For example, the central entity 101 may be and/or include a server, a processor, a logic circuit, and/or any other device capable of transmitting executables to stations. An executable (e.g., a software installation package, an executable file, executable instructions, executable machine readable instructions, executable scripts, etc.) is software that may be executed at the example station 102 to cause the station 102 to perform tasks specified in the executables. For example, the example central entity 101 may provide the example VPN application 106 when the example station 102 requests a download of the example VPN application 106. Alternatively, the example station 102 may install the example VPN application 106 by purchasing and/or installing the VPN application 106 using a disk or other storage device. Additionally, the example central entity 101 may provide executables to the example VPN application 106 in the form of updates and/or patches. Additionally, the example central entity 101 may obtain performance data and/or any other reporting data from the example station 102.

The example station 102 of FIG. 1 is a network-enabled (e.g., Wi-Fi, cellular, Ethernet, etc.) computing device. The station 102 may be, for example, a computing device, a portable device, a mobile device, a mobile telephone, a smart phone, a tablet, a gaming system, a digital camera, a digital video recorder, a television, a set top box, an e-book reader, and/or any other network-enabled device. The example station 102 includes the example OS 104, an example VPN application 106, the example VPN client 108, and the example interface 110.

The example OS 104 of FIG. 1 manages the computer hardware and/or software resources of the station 102. For example, the example OS 104 can control the computer hardware and/or software resources to execute tasks corresponding to instructions from application code. The example OS 104 may be MICROSOFT WINDOWS™, MACOS™, LINUX™, IOS™, ANDROID™, and/or any other type of operating system. In some examples, the VPN application 106 is configured based on automatic connection rules. In such examples, whenever the example OS 104 detects access to the example network 114 and determines that a VPN tunnel has not yet been established, the OS 104 instructs the VPN application 106 to establish a VPN tunnel to provide a private network to a user of the station 102.

The example VPN application 106 of FIG. 1 is an application (e.g., an application received from the example central entity 101) that, when executed, causes one or more components of the station 102 to establish a VPN tunnel to provide a secure VPN tunnel to a user of the station 102. In some examples, the VPN application 106 accesses a user interface of the station 102 to display an indication of whether a protected connection (e.g., a VPN tunnel) has been established to assure the user that the access to the network 114 is secure. The VPN application 106 may attempt to establish a VPN tunnel based on instruction from the example OS 104 and/or a user. The example VPN application 106 includes the example VPN client 108.

The example VPN client 108 of FIG. 1 establishes the VPN tunnel for the example VPN application 106. For example, the VPN client 108 may establish the VPN tunnel (e.g., a point-to-point connection) using a dedicated circuit and/or with a tunneling protocol over existing networks. The example VPN client 108 may establish the VPN tunnel in response to instructions from the example OS 104. However, as explained above, if the OS 104 determines that a network connection exists and the network connection corresponds to a captive portal, establishing a VPN tunnel will be unsuccessful (e.g., due to the limited network access), thereby causing an repeated errors to occur (e.g., because the OS 104 will continuously trigger the VPN application 106 to establish a tunnel). Accordingly, when the example VPN client 108 receives instructions to establish a VPN tunnel, the VPN client 108 transmits a probe request (e.g., an HTTP request) to the example VPN server 118 via the example access point 112 using the example interface 110.

If the VPN client 108 of FIG. 1 receives a response from the example VPN server 118 via the interface 110, the VPN client 108 runs the VPN tunneling protocol to establish the VPN tunnel. However, if the VPN client 108 does not receive a response to the probe request from the example VPN server 118 via the interface 110, the VPN client 108 prevents the multiple errors and/or retries by informing that the OS 104 that the VPN tunnel has been established (even though the VPN client 108 has not established the VPN tunnel). In this manner, the OS 104 will not continue to instruct the VPN client 108 to establish a VPN tunnel.

Once the VPN client 108 of FIG. 1 informs the OS 104 that the VPN tunnel has been established, the VPN client periodically or aperiodically transmits probe requests to the example VPN server 118 using the example interface 110 until a response is received. Once the response is received (e.g., after the user authenticates the device and the example access point 112 expands access to the example network 114), the example VPN client 108 informs the OS 104 that the VPN tunnel has failed. In this manner, the OS 104 will instruct the VPN client 108 to establish a VPN tunnel and, now that the access point 112 has expanded access to the network 114, the example VPN client 108 can properly establish the VPN tunnel. In some examples, once the response is received, the example VPN client 108 establishes the VPN tunnel and transmits the established VPN tunnel data to the example OS 104.

The example interface 110 of FIG. 1 receives and/or transmits data to the example access point 112 via a wired or wireless connection. In some examples, the interface 110 includes radio architecture to transmit/receive the data wirelessly. The example interface 110 receives and/or transmits data to the example access point 112 to access the example network 114.

The example access point 112 of FIG. 1 is a device that allows the example station 102 to wirelessly access the example network 114. The example access point 112 may be a router, a modem-router, and/or any other device that provides a wireless connection to a network. A router provides a wireless communication link to a station. The router accesses the network through a wire connection via a modem. A modem-router combines the functionalities of the modem and the router. The example access point 112 may include a processor or other logic circuit to implement its operation.

In the example environment 100 of FIG. 1, the access point 112 provides a captive portal. Accordingly, when the example station 102 connects with the example access point 112 and the station 102 is not authorized (e.g., an identifier of the station 102 is not included in an authentication list), the example access point 112 limits access to the example network 114 for the station 102. For example, the access point 112 may only allow the station 102 to access the captive portal server 116. In this manner, the example station 102 can only access a limited number (e.g., one) web site. If the example station 102 attempts to access a different website from a different server via the network 114, the example access point 112 blocks the access and/or redirects the station 102 to the captive portal website provided by the captive portal server 116. The captive portal website provides a user interface (e.g., one or more websites) for a user to self-identify to authenticate the example station 102. For example, in a coffee-shop, the captive portal server 116 may ask the user for a valid email address before authenticating the user to provide expanded and/or full access to the example network 114 so that the example station 102 can communication with additional servers (e.g., including the example VPN server 118). Once the example access point 112 has received verification that the example station 102 is authenticated from the example captive portal server 116, the example access point 112 expands and/or opens full access to the example network 114 and stores an identifier of the example station 102 for a duration of time, so that the station 102 remains authenticated for the duration of time.

The example network 114 of FIG. 1 is a system of interconnected devices and/or networks for exchanging data. The example network 114 may be implemented using any type of public or private network such as, but not limited to, the Internet, a telephone network, a local area network (LAN), a cable network, and/or a wireless network. To enable communication via the network 114, the example access point 112 includes a communication interface that enables a connection to an Ethernet, a digital subscriber line (DSL), a telephone line, a coaxial cable, or any wireless connection, etc.

The example captive portal server 116 of FIG. 1 is a computing device corresponding to the access point 112 and/or the company and/or entity that implements and/or controls the access point 112. Alternatively, the captive portal server 116 may be a virtual server executing on local or cloud computing hardware and/or may be integrated in the access point 112, etc. When the example access point 112 requests the captive portal website, the captive portal server 116 provides the captive portal website. Additionally, when the example access point 112 forwards authentication information provided by the example station 102 using the captive portal website, the example captive portal server 116 authenticates and/or validates the user based on the authentication information (e.g., by comparing the data to a database of known information, providing the information to other servers to authenticate, using a token based authentication in conjunction with other servers, etc.). Once authenticated or not authenticated, the captive portal server 116 transmits one or more data packets to the example access point 112 to verify and/or deny authentication of the user of the example station 102.

The example VPN server 118 of FIG. 1 is a server that transmits a predetermined response to the example station 102 through the access point 112 via the example network 114 in response to receiving a probe request from the station 102. According to the illustrated example, the predetermined response is a response that is known by both the example VPN server 118 and the example station 102. In this manner, the station 102 can distinguish the response from other obtained data. For example, the example network 114 may include other traffic (e.g., other HTTP traffic) that looks like the request and/or response. Accordingly, the example station 102 will be able to identify the response regardless of the other traffic in the network 114.

Figure 2:
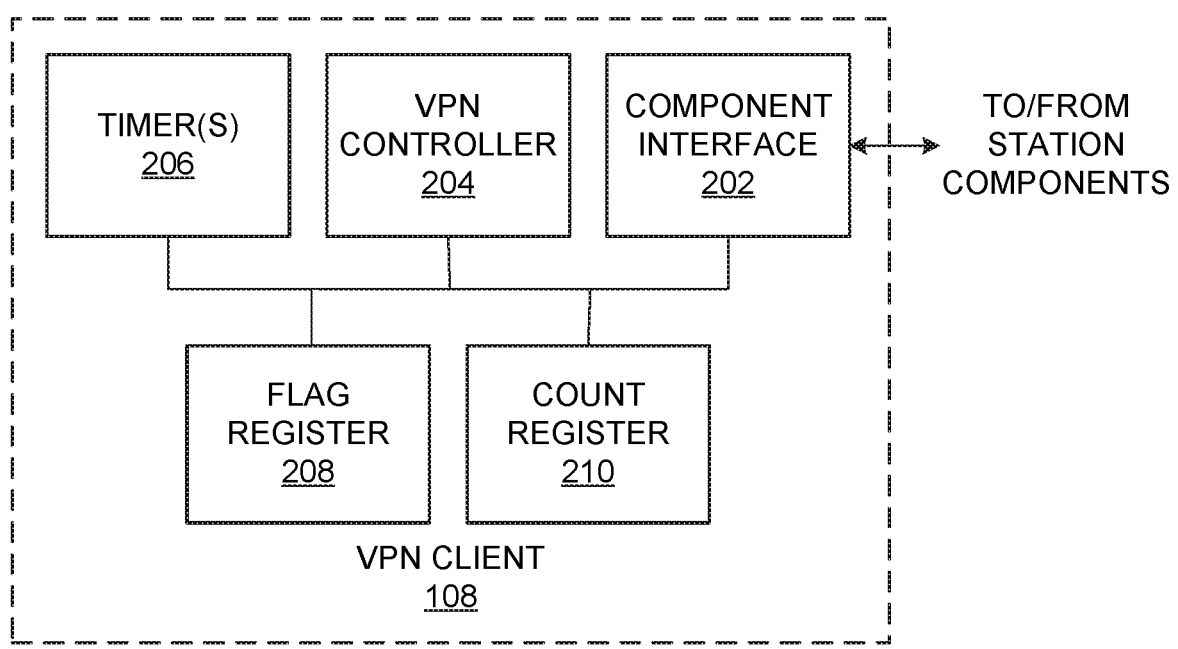
FIG. 2 is a block diagram of the example virtual private network client of FIG. 1.

FIG. 2 is a block diagram of an example implementation of the VPN client 108 of FIG. 1. The example VPN client 108 includes an example component interface 202, an example VPN controller 204, example timer(s) 206, an example flag register 208, and an example count register 210.

The example component interface 202 of FIG. 2 is a circuit that interfaces with the other components of the example station 102, including the example VPN application 106, the example interface 110, the example OS 104, and/or any other components of the example station 102. For example, the component interface 202 may receive instructions from the example OS 104 to establish a VPN tunnel. Additionally, the example component interface 202 may transmit an indication of whether the VPN tunnel was established to the example OS 104. The example component interface 202 may interface with the example interface 110 to transmit probe requests (e.g., HTTP requests), obtain probe responses (e.g., HTTP responses), and/or establish VPN tunnels.

The example VPN controller 204 of FIG. 2 is a processor including hardware (e.g., logic circuits), software, and/or firmware to execute instructions to cause the station 102 to execute a VPN connection protocol to avoid multiple errors and/or retries corresponding to a captive portal. The example VPN controller 204 determines if instructions to establish a VPN here been received from the example OS 104. If instructions have been received, the VPN controller 204 instruct the example interface 110 (e.g. via the example component interface 202) to transmit a probe request to the example VPN server 118 of FIG. 1. If the example VPN controller 204 determines that a response has been received from the example VPN server 118, the example VPN controller 204 establishes a VPN tunnel and reports the VPN tunnel to the example OS 104 via the example component interface 202. If the example VPN controller 204 determines that a response has not been received from the example VPN server 118, the example VPN controller 204 sets the "no internet" flag in the example flag register 208 and reports a "fake" VPN tunnel to the example OS 104 via the example component interface 202, to eliminate the possibility of an infinite loop. Additionally, the example VPN controller 204 continues to periodically or aperiodically instruct the example interface 110 to transmit additional probe requests until a response is obtained. Once an HTTP response is obtained, the example VPN controller 204 resets the "no internet" flag in the example flag register 208 (e.g., to indicate a full Internet connection) and informs the OS 104 via the example component interface 202 that the VPN tunnel has failed (or otherwise triggers VPN reconnection), thereby triggering the OS 104 to reinstruct the example VPN client 108 to establish a new VPN tunnel.

The example timer(s) 206 of FIG. 2 is/are logic circuit(s) and/or processor(s) including hardware, software, and/or firmware to track(s) one or more durations of time. For example, the timer(s) 206 may track the duration of time after an HTTP response has been transmitted to the example VPN server 118. In this manner, if a response has not been received within a threshold amount of time tracked by the example timer(s) 206, the timer(s) 206 can trigger VPN controller 204 to determine that the probe request (e.g., the HTTP request) has failed. Additionally, the example timer(s) 206 may track the duration of time before sending an additional probe request when a preceding probe request has failed. The example timer(s) 206 trigger(s) the example VPN controller 204 to transmit a subsequent probe request after a threshold amount of time. The threshold amount of time is based on a value stored in the example count register 210, as further described below. In some examples, the example timer(s) 206 may be a first timer to track both the duration of time after a probe request is sent to determine when the probe response (e.g., HTTP response) has failed and a second timer to track the duration of time before sending a subsequent probe request. In some examples, the example timer(s) 206 is a single timer to track both durations of time.

The example flag register 208 of FIG. 2 is a register and/or dedicated address in memory (e.g., the example local memory 413 of FIG. 4) that holds one or move value(s) (e.g., bit values) that corresponds to whether there is full internet connectivity. For example, the flag register 208 may store a first value (e.g., '0') when there is no or limited Internet connectivity and store a second value (e.g., '1') when there is full Internet connectivity. In this manner, the example VPN application 106 can determine whether or not there is Internet connectivity and/or whether a VPN tunnel has actually been established and provide accurate information to the user. For example, the VPN application 106 may transmit an indication of the connectivity and/or whether the VPN is actually established to the user via a user interface (e.g., regardless of the "fake" VPN tunnel information transmitted to the example OS 104). For example, when the example VPN client 108 cannot establish a connection to the example VPN server 118, the example VPN client 108 tells the OS 104 that the connection has been established (e.g., to prevent additional polling that can cause multiple errors and/or retries) and the example VPN application 106 can access the value stored in the example flag register 208 to determine if full network connectivity actually exists. In this manner, the example VPN application 106 can inform a user, other applications, and/or the example OPS 104 of the true status of network connectivity. As described above, the example VPN controller 204 may set or reset the value stored in the example flag register 208 based on whether a response to a probe request (e.g., HTTP request) has been received from the example VPN server 118.

The example count register 210 of FIG. 1 is a register and/or dedicated address in memory (e.g., the example local memory 413 of FIG. 4) that holds a value corresponding to a count. As described above, the count indicates how long the example timer(s) 206 should wait until triggering the VPN controller 204 to initiate transmission of a subsequent probe request in response to a failed probe request. For example, if the value stored in the count register 210 corresponds to 1 second, the timer(s) 206 will track the 1 second and trigger transmission of a subsequent probe request 1 second after a failed probe request. In some examples, the count in the count register 210 is the same throughout the VPN tunnel establishment process. In some examples, the count register 210 may increase (e.g., increment) the count with time, thereby conserving computer resources (e.g., processor resources) of the station 102. For example, the count may increment by a fixed or variable amount after each additional probe request (e.g., 1 second after a first failed attempt, 2 seconds after a second failed attempt, 3 seconds after a third failed attempt, etc.). In some examples, if the count reaches a threshold amount (e.g., 15 seconds), the count register 210 may reset the count based to the first count value (e.g., 1 second).

While an example manner of implementing the example VPN client 108 of FIG. 1 is illustrated in FIG. 2, one or more of the elements, processes and/or devices illustrated in FIG. 2 may be combined, divided, re-arranged, omitted, eliminated and/or implemented in any other way. Further, the example component interface 202, the example VPN controller 204, the example timer(s) 206, the example flag register 208, the example count register 210, and/or, more generally the example VPN client 108 of FIG. 2 may be implemented by hardware, software, firmware and/or any combination of hardware, software and/or firmware. Thus, for example, any of the example component interface 202, the example VPN controller 204, the example timer(s) 206, the example flag register 208, the example count register 210, and/or, more generally the example VPN client 108 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 202, the example VPN controller 204, the example timer(s) 206, the example flag register 208, the example count register 210, and/or, more generally the example VPN client 108 of FIG. 2 is and/or are hereby expressly defined to include a non-transitory computer readable storage device or storage disk such as a memory, a digital versatile disk (DVD), a compact disk (CD), a Blu-ray disk, etc. including the software and/or firmware. Further still, the example VPN client 108 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3A:
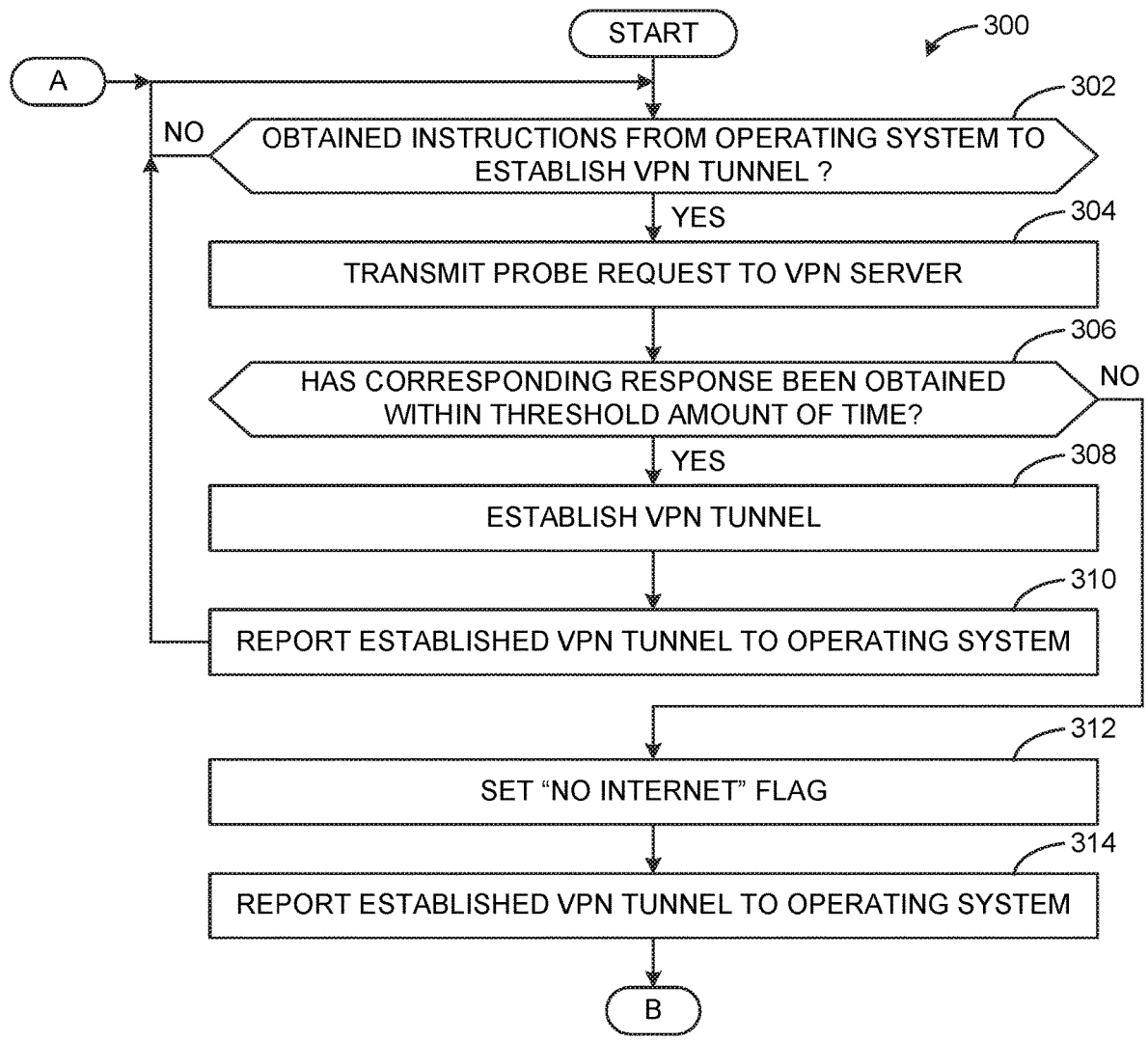
FIGS. 3A and 3B illustrate a flowchart representative of example machine readable instructions that may be executed to implement the virtual private network client of FIG. 1 and/or FIG. 2.
Figure 3B:
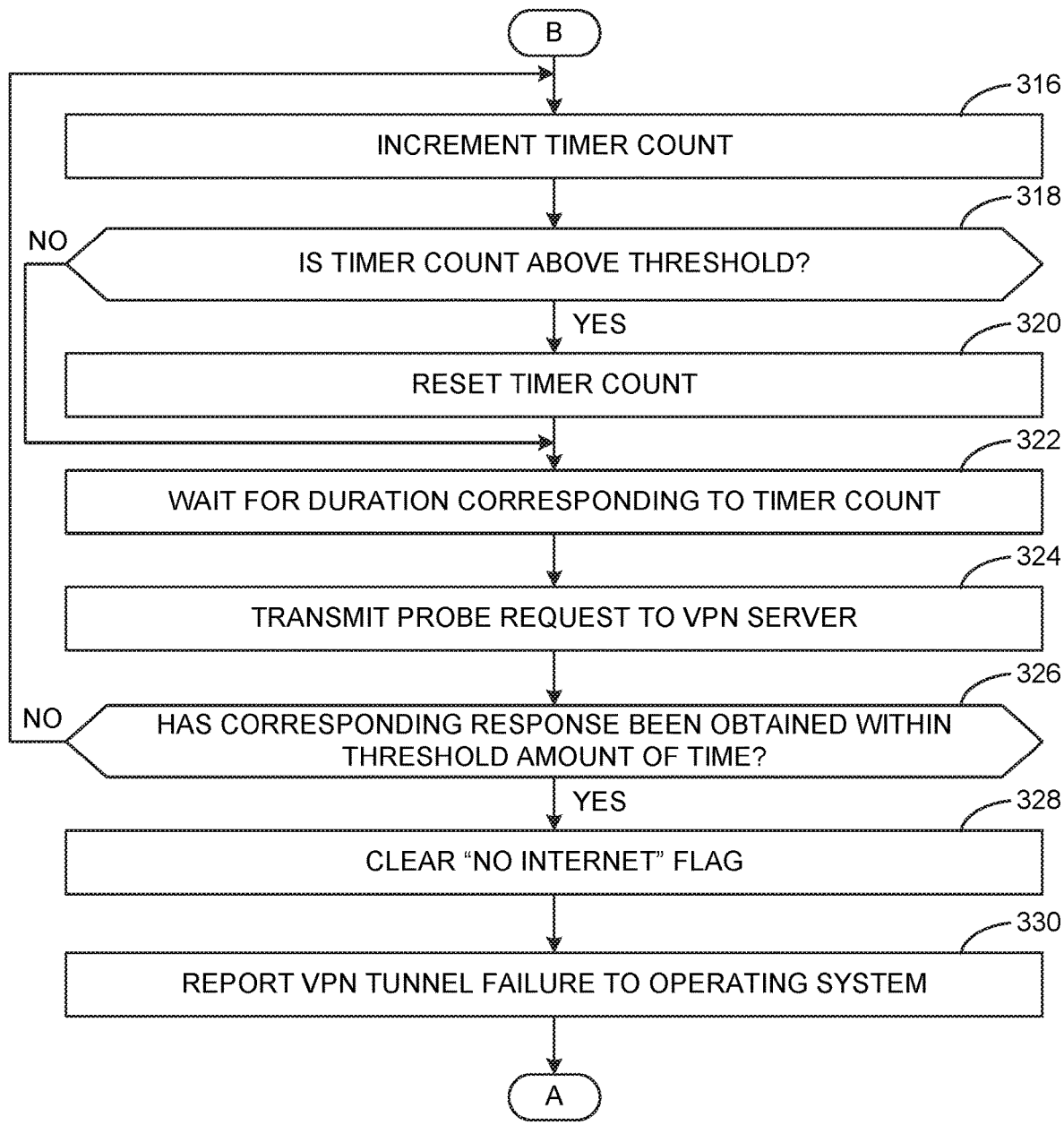

Flowcharts representative of example hardware logic, machine readable instructions, hardware implemented state machines, and/or any combination thereof for implementing the example VPN client 108 of FIG. 2 are shown in FIGS. 3A-3B. The machine readable instructions may be one or more executable program or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowcharts illustrated in FIGS. 3A-3B, many other methods of implementing the example VPN client 108 of FIG. 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example process of FIGS. 3A-3B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in that information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIGS. 3A and 3B illustrate an example flowchart 300 representative of example machine readable instructions that may transmitted to the example station 102 via the example network 114 and/or installed from a storage device that, when executed by the example VPN client 108 of FIG. 1, cause the example station 102 to implement the virtual private network client.

At block 302, the example VPN controller 204 determines if the component interface 202 has obtained instructions to establish a VPN tunnel from the example OS 104 of FIG. 1. If the example VPN controller 204 determines that the component interface 202 has not obtained instructions from the OS 104 (block 302: NO), control returns to block 302 until instructions have been obtained. If the example VPN controller 204 determines that the component interface 202 has obtained instructions from the OS 104 (block 302: YES), the example VPN controller 204 instructs the example component interface 202 to transmit a probe request (e.g., an HTTP request) to the example VPN server 118 using the example interface 110, the access point 112, and the network 114 (block 304). If the access point 112 provides a captive portal, access to the example VPN server 118 may be restricted. Thus, sending the probe request will not result in a response from the VPN server 118. However, if the access point 112 has authenticated the station 102, transmitting the probe request to the example VPN server 118 will result in a response from the VPN server 118. In some examples, the VPN controller 204 automatically instructs (e.g., based on a threshold amount of time or a trigger) the component interface 202 to transmit the probe without instructions from the example OS 104. For example, the VPN controller 204 may instruct the component interface 202 to transmit the probe request in response to a change in the network (e.g., a Wi-Fi hotspot changing).

At block 306, the example timer(s) 206 determine(s) if a corresponding response (e.g., a response for the probe request from the example VPN server 118) has been obtained within a threshold amount of time. If the example timer(s) 206 determine(s) that the corresponding response from the VPN server 188 has been obtained within the threshold amount of time (block 306: YES), the example VPN controller 204 establishes a VPN tunnel by performing a VPN tunneling protocol (block 308). At block 310, the example VPN controller 204 instructs the example component interface 202 to report to the example OS 104 that the VPN tunnel was established. The report may include information corresponding to the VPN tunnel. After block 310, control returns to block 302.

If the example timer(s) determine(s) that the corresponding response from the VPN server 188 has been not obtained within the threshold amount of time (block 306: NO), the VPN controller 204 sets the "no internet" flag stored in the example flag register 208 (block 312). For example, the VPN controller 204 may update the value stored in the flag register 208 to a value corresponding to "no internet." As described above, the "no internet" value can be read by the example VPN application 106 of FIG. 1 to provide a user with an indication that there is no or limited Internet connectivity and/or that the VPN has not been established. At block 314, the example VPN controller 204 instructs the example component interface 202 to report that the VPN tunnel was established to the example OS 104 (e.g., corresponding to a "fake VPN tunnel"). The report may include information corresponding to the fake VPN tunnel.

At block 316, the example VPN controller 204 increments the timer count in the example count register 210. The timer count identifies how long the example timer(s) 206 should wait until triggering transmission of a subsequent probe request. The timer count may be initiated and/or increment to any value (e.g., fixed or variable). At block 318, the example VPN controller 204 determines if the timer count stored in the count register 210 is above a threshold (e.g., based on user and/or manufacturer preferences). If the example VPN controller 204 determines that the timer count is not above the threshold (block 318: NO), control continues to block 322. If the example VPN controller 204 determines that the timer count is above the threshold (block 318: YES), the example VPN controller 204 resets the timer count stored in the example count register 210 to an initial value (block 320).

At block 322, the example timer(s) 206 wait(s) for a duration of time corresponding the timer count stored in the example count register 210. For example, if the timer count value corresponds to ten seconds, the example timer(s) 206 wait(s) for a duration of ten seconds. At block 324, the example VPN controller 204 transmits a subsequent probe request to the example VPN server 118. In some examples, the example timer(s) 206 trigger the example VPN controller 204 to initiate transmission of the probe request. At block 326, the example timer(s) 206 determine(s) if a corresponding response (e.g., a response for the probe request from the example VPN server 118) has been obtained within a threshold amount of time. If the example timer(s) 206 determine(s) that the corresponding response from the VPN server 188 has not been obtained within the threshold amount of time (block 326: NO), control returns to block 316 and the process continues until a subsequent probe request receives a corresponding response (e.g., a subsequent response).

If the example timer(s) 206 determine(s) that the corresponding response from the VPN server 188 has been obtained within the threshold amount of time (block 326: YES), the example VPN controller 204 clears the "no internet" flag stored in the example flag register 208 (block 328). For example, the VPN controller 204 may update the value stored in the flag register 208 to a value corresponding to "internet." As described above, the "internet" value can be read by the example VPN application 106 of FIG. 1 to provide a user with an indication that there is full and/or expanded Internet connectivity. At block 330, the example VPN controller 204 instructs the example component interface 202 to report that the VPN tunnel was failed to the example OS 104. In this manner, the example OS 104 can reinstruct the VPN application 106 to establish (e.g., re-establish) a VPN tunnel and the VPN client 108 can establish a real VPN tunnel and provide the OS 104 with the real VPN tunnel information.

Figure 4:
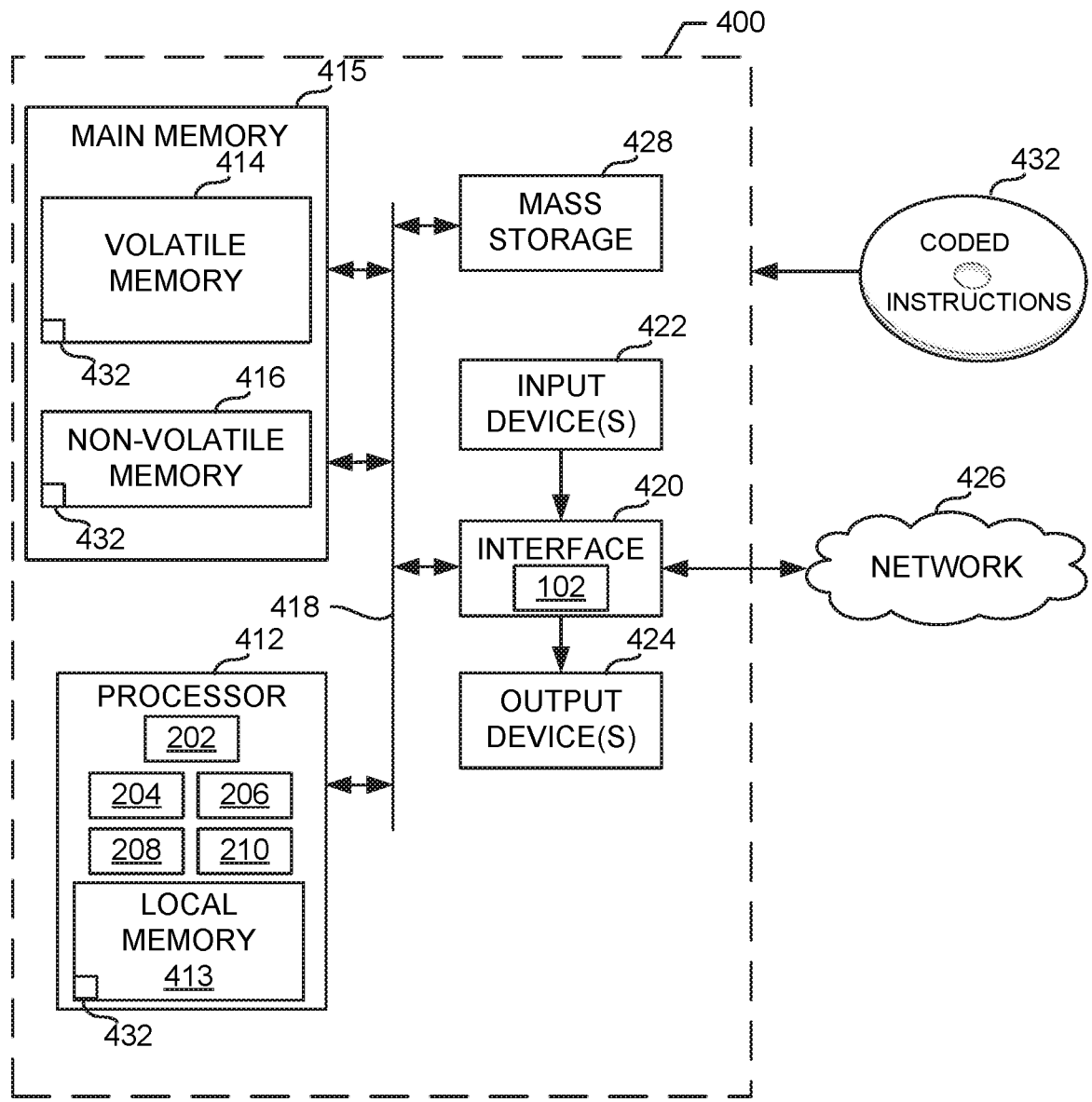
FIG. 4 is a block diagram of an example processor platform structured to execute the instructions of FIGS. 3A and/or 3B to implement the example virtual private network client of FIG. 1 and/or FIG. 2.

FIG. 4 is a block diagram of an example processor platform 400 structured to execute the instructions of FIGS. 3A-3B to implement the example VPN client 108 of FIGS. 1 and/or 2. The processor platform 400 can be, for example, a server, a personal computer, a workstation, a self-learning machine (e.g., a neural network), a mobile device (e.g., a cell phone, a smart phone, a tablet such as an iPad™), or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example component interface 202, the example VPN controller 204, the example timer(s) 206, the example flag register 208, and the example count register 210 of FIG. 2.

The processor 412 of the illustrated example includes a local memory 413 (e.g., a cache). The processor 412 of the illustrated example is in communication with a main memory 415 including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 415 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 3A-3B may be stored in the one or more mass storage devices 428, in the volatile memory 414, in the non-volatile memory 416, and/or on a removable non-transitory computer readable storage medium such as a CD or DVD.

Example methods, apparatus, systems, and articles of manufacture to implement a virtual private network with probe for network connectivity are disclosed herein. Further examples and combinations thereof include the following: Example 1 includes a non-transitory computer readable storage medium comprising instructions which, when executed, cause a machine to at least in response to a first instruction from an operating system to establish a network tunnel, transmit a probe request to a server, and in response to not receiving, from the server, a probe response to the probe request, report that the network tunnel has been established to prevent the operating system from transmitting subsequent instructions to establish the network connection until a response to a probe request is received.

Example 2 includes the non-transitory computer readable storage medium of example 1, wherein the instructions, when executed, cause the machine to transmit a subsequent probe request to the server after a first duration of time.

Example 3 includes the non-transitory computer readable storage medium of example 2, wherein the instructions, when executed, cause the machine to, in response to a subsequent response corresponding to the subsequent probe request from the server, report that the network tunnel has failed.

Example 4 includes the non-transitory computer readable storage medium of example 3, wherein the instructions, when executed, cause the machine to report that the network tunnel has failed to cause the operating system to transmit a second instruction to re-establish the network tunnel.

Example 5 includes the non-transitory computer readable storage medium of example 4, wherein the instructions, when executed, cause the machine to in response to the second instruction to establish the network tunnel, transmit a second probe request to the server, and in response to receiving a response to the second probe request from the server establish the network tunnel, and report that the network tunnel has been established.

Example 6 includes the non-transitory computer readable storage medium of example 3, wherein the instructions, when executed, cause the machine to in response to not receiving the response to the probe request from the server, set a flag corresponding to no network access, and in response to the subsequent response corresponding to the subsequent probe request from the server, clear the flag.

Example 7 includes the non-transitory computer readable storage medium of example 6, wherein the instructions, when executed, cause the machine to inform at least one of a user, an application, or the operating system of a network connectivity based on the flag.

Example 8 includes the non-transitory computer readable storage medium of example 2, wherein the instructions, when executed, cause the machine to, in response to not receiving a subsequent response corresponding to the subsequent probe request from the server, transmit a second subsequent response after a second duration of time.

Example 9 includes the non-transitory computer readable storage medium of example 8, wherein the first duration of time and the second duration of time are different.

Example 10 includes the non-transitory computer readable storage medium of example 1, wherein the instructions, when executed cause the machine to wait a threshold amount of time for receipt of the probe response before reporting that the network tunnel has been established.

Example 11 includes the non-transitory computer readable storage medium of example 1, wherein the instructions, when executed, cause the machine to, in response to not receiving the response to the probe request from the server, determine that there is at least one of no network access or limited network access.

Example 12 includes the non-transitory computer readable storage medium of example 1, wherein network connectivity is suspended during attempts to establish the network tunnel.

Example 13 includes the non-transitory computer readable storage medium of example 12, wherein the suspended network connectivity and repeated instructions to establish the network tunnel prevent authentication of a device running the operating system via a captive portal.

Example 14 includes an apparatus to implement a virtual private network with probe for network connectivity, the apparatus comprising an interface to, in response to a first instruction from an operating system to establish a network tunnel, transmit a probe request to a server, and a controller to, in response to not receiving, from the server, a probe response to the probe request, report that the network tunnel has been established to prevent the operating system from transmitting subsequent interactions to establish the network connection until a response to a probe request is received.

Example 15 includes the apparatus of example 10, wherein the interface is to transmit a subsequent probe request to the server after a first duration of time.

Example 16 includes the apparatus of example 11, wherein the controller is to, in response to a subsequent response corresponding to the subsequent probe request from the server, report that the network tunnel has failed.

Example 17 includes the apparatus of example 12, wherein the controller is to report that the network tunnel has failed to cause the operating system to transmit a second instruction to re-establish the network tunnel.

Example 18 includes the apparatus of example 13, wherein the interface is to, in response to the second instruction to establish the network tunnel, transmit a second probe request to the server, and the controller is to, in response to receiving a response to the second probe request from the server establish the network tunnel, and report that the network tunnel has been established.

Example 19 includes a method to implement a virtual private network with probe for network connectivity, the method comprising in response to a first instruction to establish a network tunnel, transmitting a probe request to a server, and in response to not receiving, from the server, a probe response to the probe request, reporting, by executing an instruction with a processor, that the network tunnel has been established.

Example 20 includes the method of example 19, further including transmitting a subsequent probe request to the server after a first duration of time.

From the foregoing, it will be appreciated that example methods, apparatus and articles of manufacture have been disclosed herein to implement a virtual private network with probe for network connectivity. When a VPN is configured to automatically establish a VPN tunnel when a network-based connection is available, an OS of a device will instruct the VPN to establish the VPN tunnel when the OS detects network connectivity. However, if the OS detects network connectivity from a captive portal that only allows access to one server, the OS and VPN application will end up in multiple errors and/or retries which blocks all network access for the user. Examples disclosed herein include a VPN client that, in response to determining that the network connectivity is limited and thus a VPN tunnel cannot be established, tells the OS that a VPN tunnel has been established to prevent an iterative loop. Once the VPN client reports to the OS, examples disclosed herein monitor the network to determine when full and/or expanded network access has been established and subsequently establish a real VPN tunnel without ever entering an iterative loop. Disclosed methods, apparatus and articles of manufacture are accordingly directed to one or more improvement(s) in the functioning of a computer by generating an automated VPN for limited access networks without entering into an iterative loop that prevents all network access.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A non-transitory computer readable storage medium comprising instructions which, when executed, cause a machine to at least:
   in response to a first instruction from an operating system to establish a network tunnel, transmit a probe request to a server; and
   in response to not receiving, from the server, a probe response to the probe request, generate a report that the network tunnel has been established; and
   transmit the report to the operating system to prevent the operating system from transmitting subsequent instructions to establish the network tunnel until a response to a probe request is received.

2. The non-transitory computer readable storage medium of claim 1, wherein the instructions, when executed, cause the machine to transmit a subsequent probe request to the server after a first duration of time.

3. The non-transitory computer readable storage medium of claim 2, wherein the instructions, when executed, cause the machine to, in response to a subsequent response corresponding to the subsequent probe request from the server, report that the network tunnel has failed.

4. The non-transitory computer readable storage medium of claim 3, wherein the instructions, when executed, cause the machine to report that the network tunnel has failed to cause the operating system to transmit a second instruction to re-establish the network tunnel.

5. The non-transitory computer readable storage medium of claim 4, wherein the instructions, when executed, cause the machine to:
   in response to the second instruction to establish the network tunnel, transmit a second probe request to the server; and
   in response to receiving a response to the second probe request from the server:
   establish the network tunnel; and
   report that the network tunnel has been established.

6. The non-transitory computer readable storage medium of claim 3, wherein the instructions, when executed, cause the machine to:
   in response to not receiving the response to the probe request from the server, set a flag corresponding to no network access;
   in response to the subsequent response corresponding to the subsequent probe request from the server, clear the flag; and
   inform at least one of a user, an application, or the operating system of network connectivity based on the flag.

7. The non-transitory computer readable storage medium of claim 1, wherein the network tunnel has not been established at a time that the report is provided.

8. The non-transitory computer readable storage medium of claim 2, wherein the instructions, when executed, cause the machine to, in response to not receiving a subsequent response corresponding to the subsequent probe request from the server, transmit a second subsequent response after a second duration of time.

9. The non-transitory computer readable storage medium of claim 8, wherein the first duration of time and the second duration of time are different.

10. The non-transitory computer readable storage medium of claim 1, wherein the instructions, when executed cause the machine to wait a threshold amount of time for receipt of the probe response before reporting that the network tunnel has been established.

11. The non-transitory computer readable storage medium of claim 1, wherein the instructions, when executed, cause the machine to, in response to not receiving the response to the probe request from the server, determine that there is at least one of no network access or limited network access.

12. The non-transitory computer readable storage medium of claim 1, wherein network connectivity is suspended during attempts to establish the network tunnel.

13. The non-transitory computer readable storage medium of claim 12, wherein the suspended network connectivity and repeated instructions to establish the network tunnel prevent authentication of a device running the operating system via a captive portal.

14. An apparatus to implement a virtual private network with probe for network connectivity, the apparatus comprising:
    an interface to, in response to a first instruction from an operating system to establish a network tunnel, transmit a probe request to a server; and
    a controller to:
    determine that the network tunnel cannot be established based on not obtaining a probe response from the server; and
    in response to determining that the network tunnel cannot be established, report to the operating system that the network tunnel has been established, the report to cause the operating system to refrain from transmitting a subsequent instruction to establish the network tunnel until a response to a probe request is received.

15. The apparatus of claim 14, wherein the interface is to transmit a subsequent probe request to the server after a first duration of time.

16. The apparatus of claim 15, wherein the controller is to, in response to a subsequent response corresponding to the subsequent probe request from the server, report that the network tunnel has failed.

17. The apparatus of claim 16, wherein the controller is to report that the network tunnel has failed to cause the operating system to transmit a second instruction to re-establish the network tunnel.

18. The apparatus of claim 17, wherein:
    the interface is to, in response to the second instruction to establish the network tunnel, transmit a second probe request to the server; and
    the controller is to, in response to receiving a response to the second probe request from the server:
    establish the network tunnel; and
    report that the network tunnel has been established.

19. A method to implement a virtual private network with probe for network connectivity, the method comprising:
    in response to a first instruction to establish a network tunnel, transmitting a probe request to a server; and
    in response to not receiving, from the server, a probe response to the probe request, reporting, by executing an instruction with a processor, that the network tunnel has been established.

20. The method of claim 19, further including transmitting a subsequent probe request to the server after a first duration of time.

* * * * *